(12) United States Patent
Matsushita et al.

(10) Patent No.: US 6,206,575 B1
(45) Date of Patent: Mar. 27, 2001

(54) CAGE FOR BEARING AND BEARING USING THE SAME

(75) Inventors: Tsugio Matsushita, Kashiwara; Shigetaka Ashida, Ikoma-gun, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/400,977

(22) Filed: Sep. 22, 1999

(30) Foreign Application Priority Data

Oct. 29, 1998 (JP) .................................................. 10-307927

(51) Int. Cl.[7] ...................................................... F16C 33/38
(52) U.S. Cl. .......................... 384/523; 384/470; 384/528; 384/573
(58) Field of Search ..................................... 384/470, 520, 384/523, 526–530, 551, 572, 576, 577; 29/898.067

(56) References Cited

U.S. PATENT DOCUMENTS

| 4,239,304 | * | 12/1980 | Wakunami | 384/573 |
| 4,588,313 | * | 5/1986 | Knappe et al. | 384/520 X |
| 4,844,628 | * | 7/1989 | Knappe | 384/523 X |
| 4,865,473 | * | 9/1989 | DeVito | 384/523 |
| 5,743,659 | * | 4/1998 | Stewart | 384/573 |
| 5,749,661 | * | 5/1998 | Moller | 384/526 |

FOREIGN PATENT DOCUMENTS

| B2 5-22086 | 3/1993 | (JP) . |
| 9-88968 | 3/1997 | (JP) . |

* cited by examiner

Primary Examiner—Thomas R. Hannon
(74) Attorney, Agent, or Firm—Birch, Stewart, Kolasch & Birch, LLP.

(57) ABSTRACT

The invention has plural plate-like members, each molded by a metal die using a synthetic resin material in a shape having pockets for retaining rolling elements. A shape obtained by mutually connecting each of the plural plate-like members with connecting portions at both ends is a substantially cylinder shape. A shape of a section between both end portions of each plate-like member has a convex warped shape constituting a part of the cylinder by being subjected to a distortion action owing to heat contraction after being molded by the metal die.

9 Claims, 3 Drawing Sheets

CAGE FOR BEARING AND BEARING USING THE SAME

BACKGROUND OF THE INVENTION

1. Field of the Invention

The present invention relates to a cage for bearing used in a bearing such as a swivel seat bearing, and in more detailed to a cage for bearing, which is formed by connecting plural plate-like members in a cylindrical shape, and a bearing using the same.

2. Description of the Related Art

A swivel seat bearing, includes members called separators that are interposed between respective balls in order to prevent the balls adjoining in circumferential direction from directly contacting each other, without using the cage. This type of bearing is difficult to be assembled and, further, the separators interfere with the rotation of the balls, so that a rotational torque becomes large.

Contrary to this, the swivel seat bearing of a type in which a usual cylindrical cage used in radial ball bearing is utilized is easy to be assembled and its rotational torque is reduced as well.

However, if a diameter of the swivel seat bearing becomes large, for the conventional cylindrical cage, its wall thickness becomes very thin and it becomes flexible owing to its insufficient rigidity, so that its roundness becomes extremely low and thus it cannot be used.

Further, there is known a cage formed into an approximately cylindrical shape by continuously arranging plural plate-like pieces in a circumferential direction. It is necessary that each of the plate-like pieces constituting this cage has a shape warped like a bow when viewed from the side. This warped shape is obtained by a direct replica from metal die molding the plate-like member. In this case, in order to prevent an unnecessary distortion deformation after the molding, the plate-like member is adapted such that the distortion deformation after the molding does not occur as far as possible by using a hard material or mixing reinforcing fibers as the plate-like member.

For the cage consisting of such plate-like members, since it is necessary to mold the plate-like member into a special shape worked into the bow shape by the metal die, costs for designing and manufacturing the metal die become high, so that a manufacturing cost of the cage becomes high.

Moreover, in case of the cage consisting of the plate-like members, in order to change its diametric dimension in large or small size, it is necessary to prepare a plurality of molding metal dies for its exclusive use, since it is necessary to change a warp degree of the plate-like member. Thus, equipment cost is greatly increased.

SUMMARY OF THE INVENTION

Therefore, a main object of the invention is to provide the cage for bearing, which has a structure capable of being manufactured at a low cost.

Another object of the invention is to provide the cage for bearing, wherein the cost for designing and manufacturing the metal die is low and the cost for manufacturing the cage is low as well.

Further another object of the invention is to provide the cage wherein, when it is necessary to change the warp degree, a low cost metal die suffices and the equipment cost can be reduced.

Still another object of the invention is to provide the bearing which is easily assembled using the foregoing cage for bearing and whose rotational torque is reduced.

Other objects, characteristics and advantages of the invention will become clear from the following description.

The cage for bearing of the invention is basically composed of the plural plate-like members each molded from a synthetic resin material by the metal die in a shape having pockets for retaining rolling elements, a shape obtained by mutually connecting each of the plural plate-like members at both end portions in a substantially cylinder shape, and a section between the both end portions of the each plate-like member has a convex warped shape constituting a part of the cylinder by being subjected to a distortion action owing to heat contraction after being molded by the metal die.

Preferably, the plate-like member is provided on its surface at a side becoming the convex shape with recesses for warping it in the convex shape constituting a part of the cylinder by being subjected to the distortion action.

Preferably, the recesses are provided in several places at a desired interval in a circumferential direction of the plate-like member.

Preferably, the recesses are elongated grooves along an axial direction.

Preferably, the plate-like member is formed with the elongated grooves at a side of the pocket.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE INVENTION

Hereunder, preferred embodiments of the invention will be described with reference to the drawings.

Figure 1:
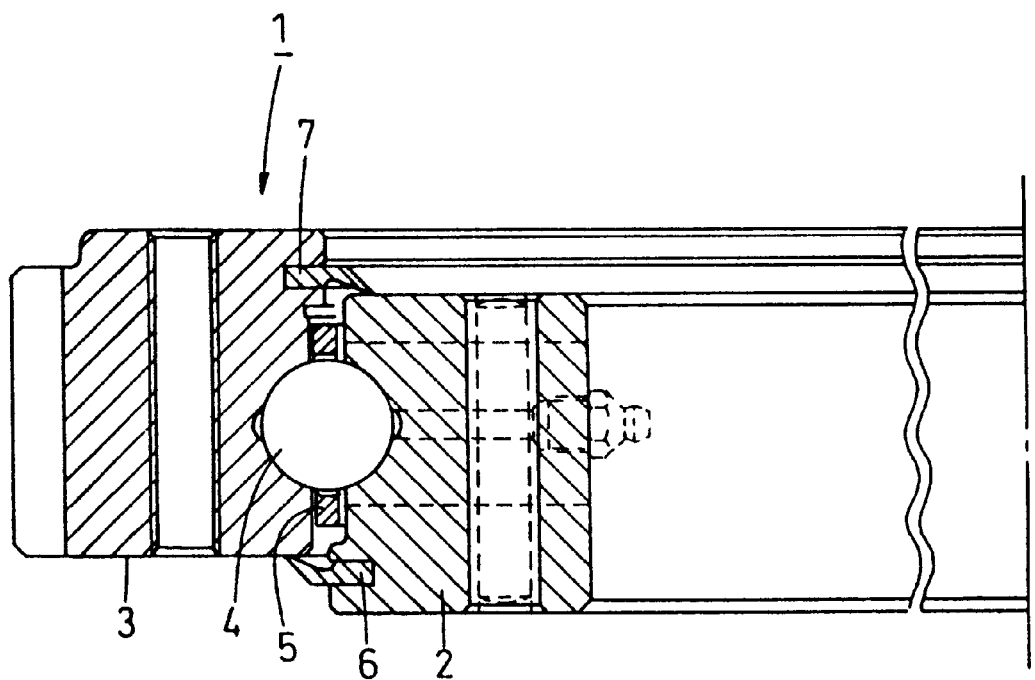
FIG. 1 is a longitudinally sectioned side view of a half of a swivel seat bearing having a cage for bearing according to a preferred embodiment of the invention.
Figure 2:
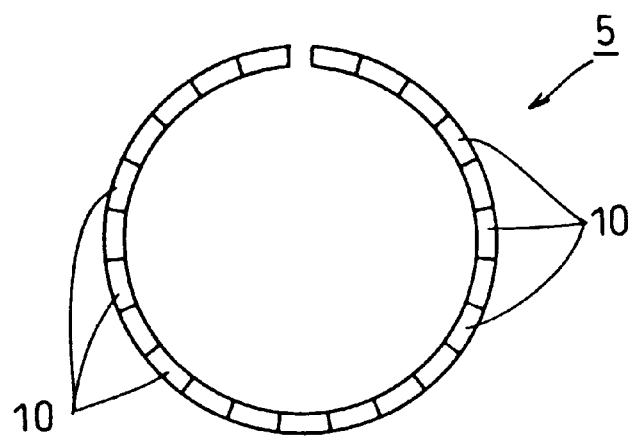
FIG. 2 is a side view of the cage shown in FIG. 1.
Figure 3:
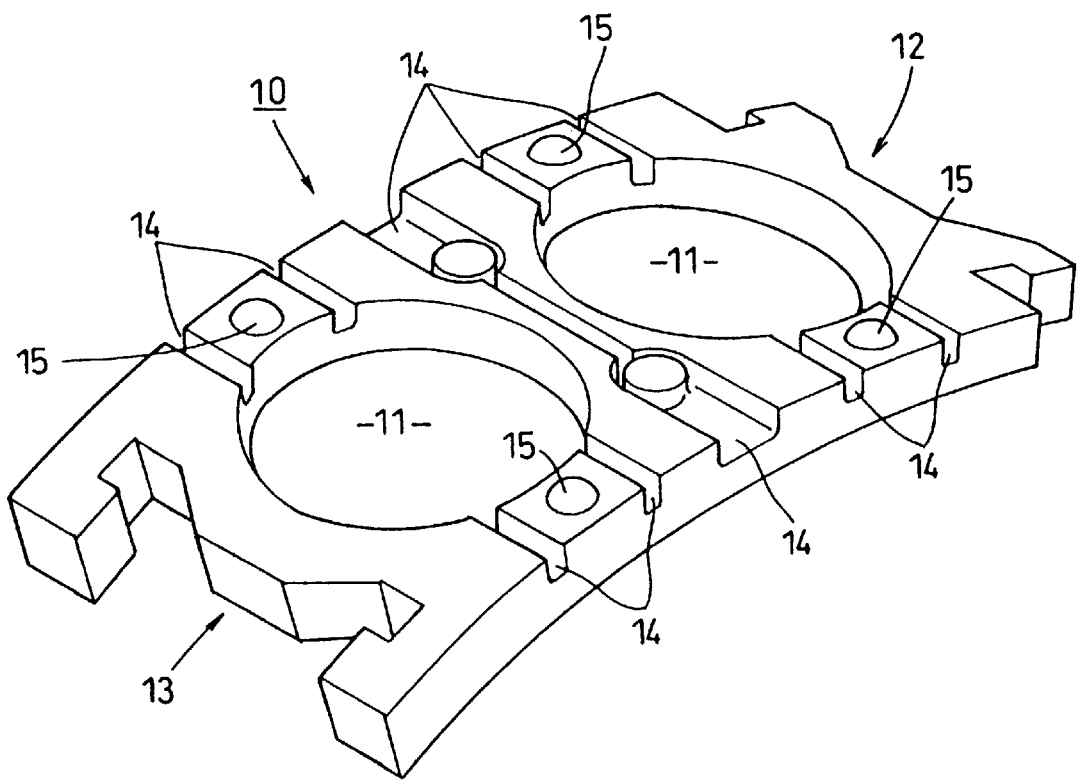
FIG. 3 is a perspective view of a plate-like member constituting the cage of FIG. 2.
Figure 4:
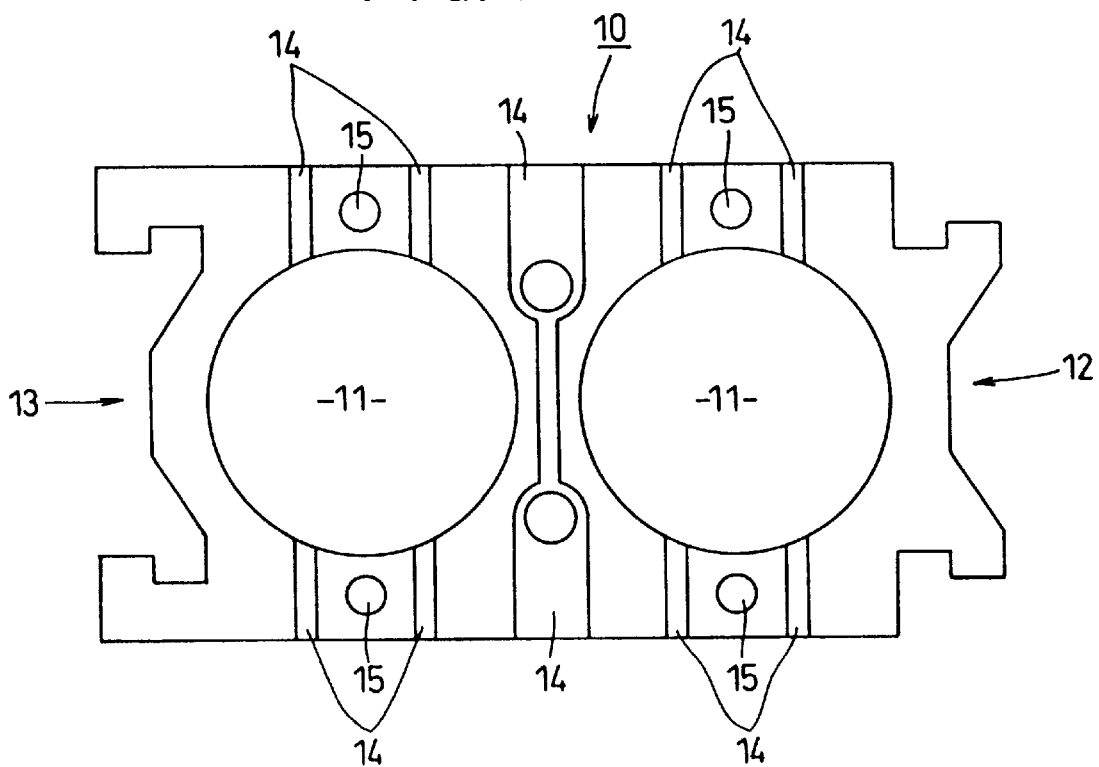
FIG. 4 is a plan view showing a state before the plate-like member of FIG. 3 is warped.
Figure 5:
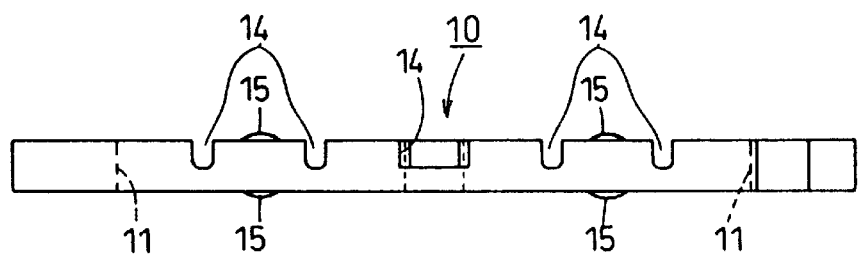
FIG. 5 is a side view showing a state before the plate-like member of FIG. 3 is warped.

FIG. 1 to FIG. 5 relate to a preferred embodiment of the invention. FIG. 1 is a longitudinally sectioned side view of a half of a swivel seat bearing as an example of bearing. FIG. 2 is a side view of a cage single body. FIG. 3 is a perspective view of a plate-like member constituting the cage. FIG. 4 is a plan view showing a state before the plate-like member is warped. FIG. 5 is a side view showing a state before the plate-like member is warped.

Referring to FIG. 1, a swivel seat bearing 1 comprises an inner ring 2, an outer ring 3, plural balls 4 as rolling elements interposed between the inner ring 2 and the outer ring 3, a cage 5 for retaining the balls 4, and seals 6,7 for sealing a gap between the inner ring 2 and the outer ring 3.

Referring to FIG. 2, the cage 5 is basically formed into a substantially cylinder shape by connecting plural plate-like members 10 in a circumferential direction. Here, one part on a circumferece is separated without being connected. Referring to FIG. 3 to FIG. 5, the plate-like member 10 is formed into an approximately rectangular shape when viewed from above. A shape of a section between both end portions in a longitudinal direction of the plate-like member 10 has a convex (bow-like) warped shape constituting a part of the cylinder. The cage 5 becomes a cylinder shape by mutually connecting a desired number of such plate-like members 10.

The plate-like member 10 respectively has two pockets 11,11 for retaining the balls at its desired positions in the longitudinal direction and, at both end sides in the longitudinal direction, connecting portions 12,13 having shapes capable of being mutually connected. One connecting portion 12 has a convex shape, and the other connecting portion 13 has a concave shape fitting with the convex shape of the connecting portion 12. In this case, the convex shape and the concave shape are set such that an interference for enabling a force fit between the connecting portion 12 and the connecting portion 13 is provided. By this, when the plural plate-like members 10 are respectively connected mutually with the connecting portions 12,13 of each of the adjoining plate-like members 10, each plate-like member 10 is prevented from shifting in its respective circumferential direction and axial direction.

In order to constitute the cylinder shape cage 5 by mutually connecting the plural plate-like members 10, it is necessary that individual plate-like member 10 has a shape corresponding to a part of the cylinder shape, i.e., a bow-like warped shape. Accordingly, first, the plate-like member 10 is molded in a flat plate by using a metal die. Although this molding is performed under high temperature, the flat plate-like member 10 is cooled after the molding. At this time, the flat plate-like member 10 is warped like a bow by heat contraction and thus becomes the bow-like plate-like member 10 shown in the drawing. Since a metal die having a cavity for forming the plate-like member with no warp suffices, a metal die design is simple and, further, the plate-like member 10 can be manufactured at a low cost. In this case, in order that a direction along which the plate-like member 10 is warped from the flat plate shape to the convex shape by heat contraction is always decided univocally, the plate-like member 10 is provided at its upper surface, i.e., a surface at a side that becomes the convex shape, with recesses at its plural places in a longitudinal direction, preferably elongated grooves 14. That is, since a thickness at a position where the elongated groove 14 exists becomes thinner than that at another region, it follows that the plate-like member is warped like a bow in such a form that, with the heat contraction after the molding, an opening side, i.e., an upper surface side, of the elongated groove 14 becomes convex and a lower surface side becomes concave. Further, as a molding material allowing this warp, there is, for example, a synthetic resin material such as polyamide 66 (PA). If this synthetic resin material is used, it is not necessary to mix reinforcing fibers, etc. which have been hitherto indispensable. However, carbon, heat stabilizer and the like are mixed as needed.

Besides, on upper and lower surfaces of the plate-like member 10, there are provided eight partially spherical surface protrusions 15 in total, i.e., four on each surface. By the protrusions 15, it becomes possible to reduce contacting surface areas with respect to the inner ring 2 and the outer ring 3 and, further, it is possible to prevent an occurrence of a phenomenon wherein the cage is attracted to the inner ring 2 and the outer ring 3 by the action of the lubricating oil.

If the cage 5 is formed by connecting the plural plate-like members 10, the respective elongated grooves 14 of each plate-like member 10 function as sumps for lubricant such as grease. By this, where the cage is caused to be guided by the outer ring 3, a resistance of the cage 5 against the outer ring 3 when contacting can be reduced. Further, as to the elongated grooves 14 formed at a side of the pocket 11, since the lubricant gathered therein becomes easy to be fed into the pocket 11, they can contribute to improve a lubricity of the ball 4.

As to the elongated groove 14 for promoting the warp of the plate-like member 10, if its position to be formed, number, depth, width and the like are managed, it is possible to optionally adjust a degree of the warp after the molding. Therefore, by managing the warp of the plate-like member 10 in a large or small degree, it is possible to optionally change a diametrical dimension and the like of the cage 5. For example, in the case of a conventional cage, in order to change its diametrical dimension to a large or small size, it is required to expend money for equipment because it is necessary to prepare a plurality of exclusive molding metal dies. In case of the cage of the present invention, since it suffices if a plurality of inexpensive molding metal dies are prepared, the equipment cost becomes low in comparison with prior art.

Incidentally, the invention is not limited to the foregoing embodiment, and various applications and modifications are considered.

Figure 6:
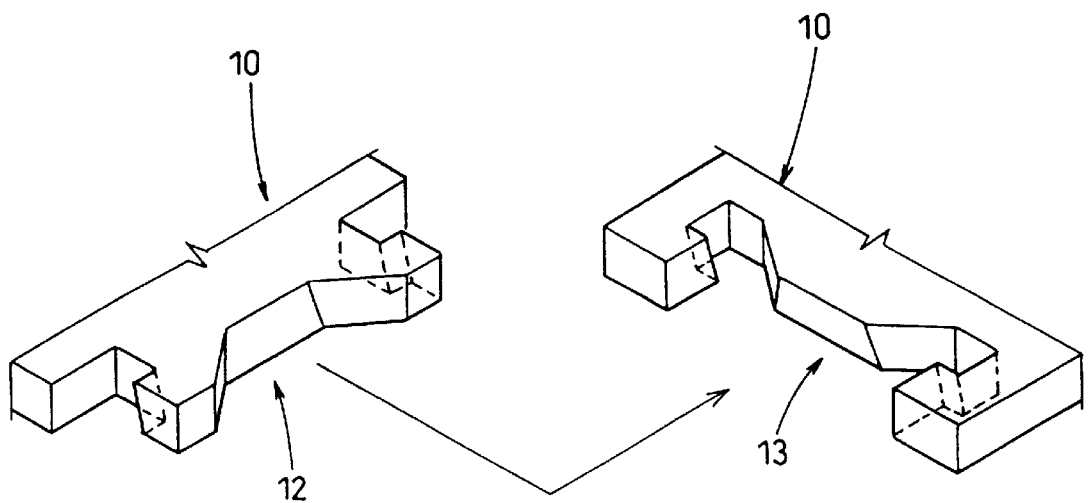
FIG. 6 is a perspective view showing a modified embodiment.

In the foregoing embodiment, as to the respective connections of the plate-like members 10, it is adapted such that these connections become strong by mutually force-fitting the connecting portions 12,13. However, as shown in FIG. 6, it is possible to adopt a form of snap fit by making a part of each end face of the respective connecting portions 12,13 into a taper surface. Also in this case, under a state that the respective connecting portions 12,13 are mutually connected, they are prevented from shifting in a radial direction and an axial direction.

In the foregoing embodiments, although the cage 5 is made into a shape for a ball bearing whose rolling elements are balls, it can be formed for a roller bearing whose rolling elements are rollers.

While there has been described what is at present considered to be preferred embodiments of the invention, it will be understood that various modifications may be made therein, and it is intended to cover in the appended claims all such modifications as fall within the true spirit and scope of the invention.

What is claimed is:

1. A cage for bearing basically composed of plural plate-like members, each molded from a synthetic resin material by a metal die in a shape having pockets for retaining rolling elements, wherein a shape obtained by mutually connecting each of said plural plate-like members at both end portions is a substantially cylinder shape, and a section between said both end portions of said each plate-like member has a convex warped shape constituting a part of said cylinder by being subjected to a distortion action owing to heat contraction after being molded by said metal die.

2. A cage for bearing according to claim 1, wherein said plate-like member is provided on its surface at a side becoming said convex shape with recesses for warping it in the convex shape constituting a part of said cylinder by being subjected to said distortion action owing to heat contraction.

3. A cage for bearing according to claim 2, wherein said recesses are provided in several places at a desired interval in circumferential direction of said plate-like member.

4. A cage for bearing according to claim 2, wherein said recesses are elongated grooves along an axial direction.

5. A cage for bearing according to 4, wherein said plate-like member is formed with said elongated grooves at a side of said pocket.

6. A cage for bearing according to claim 1, wherein said plate-like member has plural protrusions.

7. A cage for bearing according to claim 1, wherein a connecting portion at one end side of said plate-like member is a convex portion and a connecting portion at the other end side is a concave portion fitting with said convex portion, and there is provided an interference for enabling a force fit between said both connecting portions when the connecting portions are connected.

8. A cage for bearing according to claim 7, wherein a part of each end face of said convex portion and said concave portion is made into a taper surface.

9. A bearing having an inner ring, an outer ring, plural rolling elements interposed between said inner ring and said outer ring, and a cage for retaining said rolling elements, wherein said cage is basically composed of plural plate-like members, each molded from a synthetic resin material by a metal die in a shape having pockets for retaining rolling elements, a shape obtained by mutually connecting each of said plural plate-like members at both end portions is a substantially cylinder shape, and a section between said both end portions of said each plate-like member has a convex warped shape constituting a part of said cylinder by being subjected to a distortion action owing to heat contraction after being molded by said metal die.

* * * * *